(Model.)  2 Sheets—Sheet 1.
J. W. NEFF.
WASHING MACHINE.
No. 363,667.  Patented May 24, 1887.
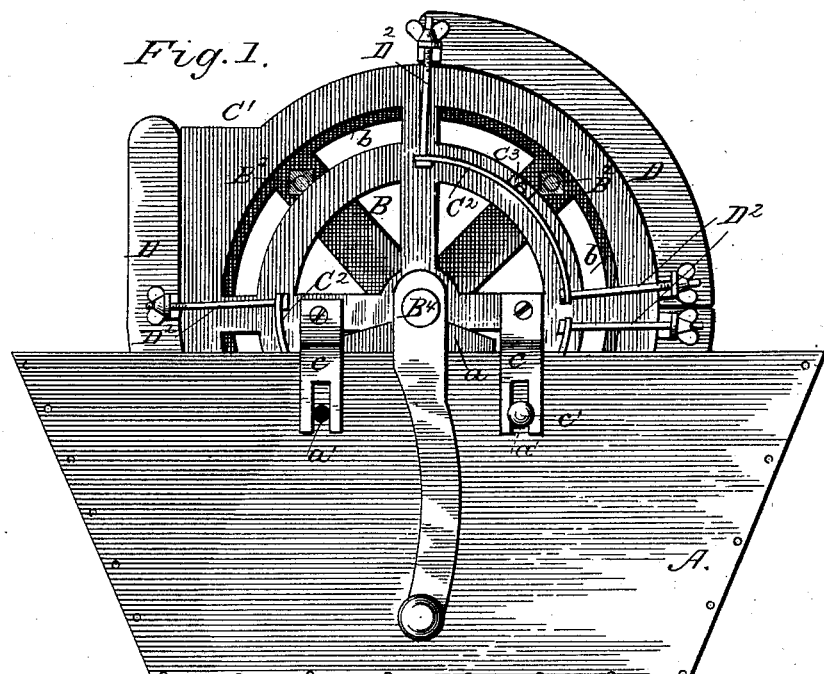
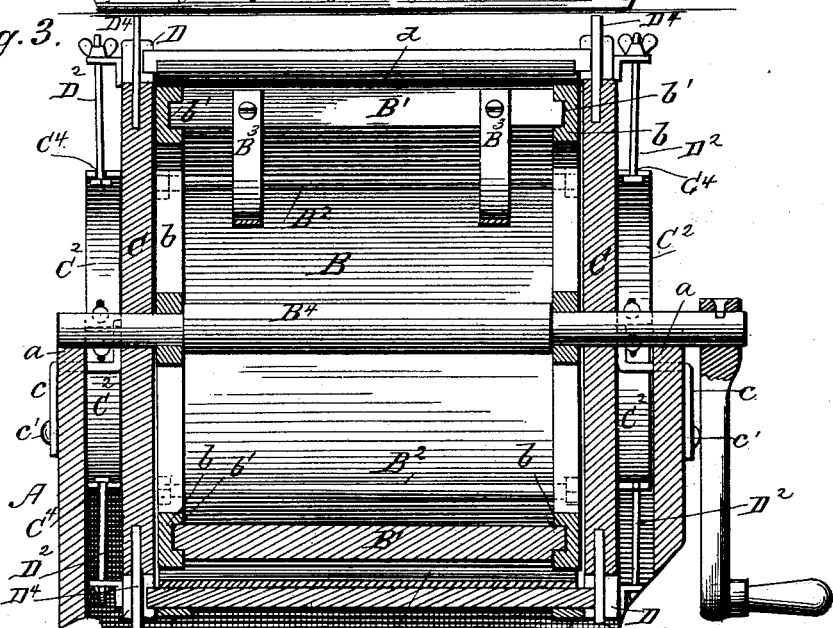
WITNESSES:
Fred G. Dieterich
Geo. H. Evans
INVENTOR:
J. W. Neff
BY Munn & Co.
ATTORNEYS.

(Model.) 2 Sheets—Sheet 2.
J. W. NEFF.
WASHING MACHINE.
No. 363,667. Patented May 24, 1887.
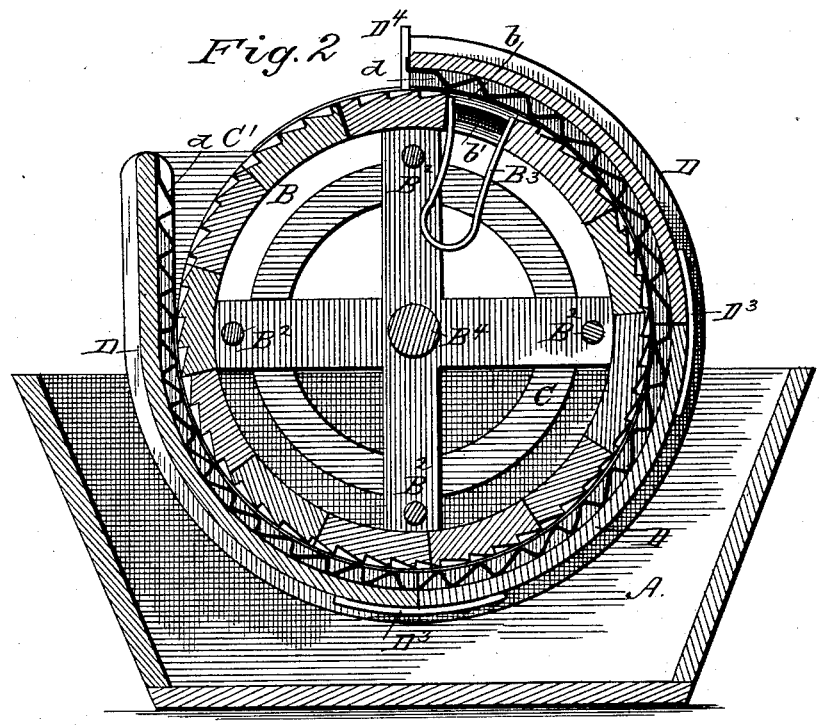
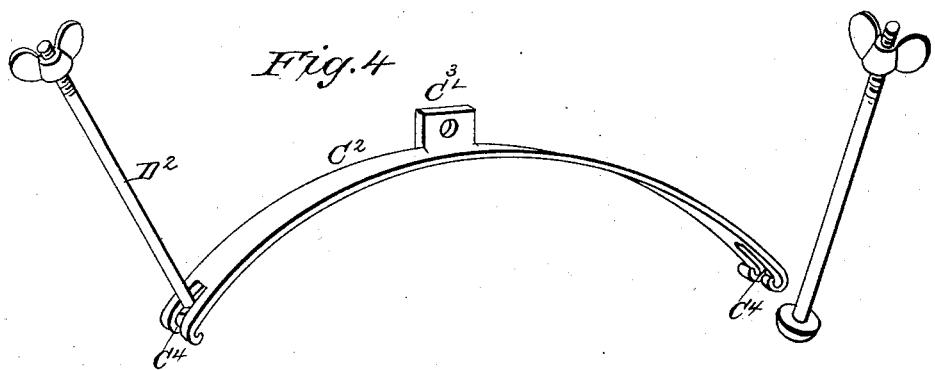
WITNESSES:
Fred G. Dieterich
Geo. H. Evans
INVENTOR:
J. W. Neff
BY Munn & Co.
ATTORNEYS.

UNITED STATES PATENT OFFICE.

JOHN WESLEY NEFF, OF BUCKHANNON, WEST VIRGINIA, ASSIGNOR OF ONE-HALF TO FRANCIS M. TEETS, OF SAME PLACE.

WASHING-MACHINE.

SPECIFICATION forming part of Letters Patent No. 363,667, dated May 24, 1887.

Application filed January 21, 1887. Serial No. 225,027. (Model.)

*To all whom it may concern:*

Be it known that I, JOHN WESLEY NEFF, of Buckhannon, in the county of Upshur and State of West Virginia, have invented certain new and useful Improvements in Washing-Machines, of which the following is a specification, reference being had to the accompanying drawings, forming part thereof, in which—

Figure 1 is a side view of my washing-machine. Fig. 2 is a vertical longitudinal section thereof. Fig. 3 is a transverse section, and Fig. 4 is a detail view of the bowed spring.

The invention will first be described, and then specifically pointed out in the claims.

A represents the suds-box, of any suitable construction, and having bearings $a$ in its upper sides and bolt-holes $a'$ below and at opposite sides of the said bearings, for a purpose to be presently described.

B is the revolving drum or cylinder, formed of the circular ends $b$, having annular grooves $b'$ in their adjacent inner faces, into which tenons on the ends of the ribbed slats B' project, cross-rods $B^2$ holding the ends and slats together. A space is left between two of the slats, one or both of which are free to slide in the annular grooves $b'$ toward or from each other, and springs are used for forcing said movable slat or slats toward the fixed slats, so that clothing may be grasped between the meeting edges of the fixed and movable slats, to be carried around by the revolution of the drum. U-shaped plate-springs $B^3$ within the drum are preferably used for operating the sliding slat or slats, the ends of the springs being secured to the slats at opposite sides of the opening.

$B^4$ is the drum-shaft, having a suitable crank or operating device and revolving in the bearings $a$.

To the inner faces of the sides of the suds-box A the plates C are removably secured and supported by means of the brackets $c$ and bolts $c'$ passed through the apertures $a'$, the said plates C having central apertures, through which the drum-shaft freely passes. These end plates, C, are circular and are of slightly greater diameter than the drum B, so that the rubbing-surfaces of the concave sections D, to be presently described, and the drum will not contact. The end plates, C, are each provided with an offset portion, C', as shown, for a purpose to be presently set forth, and to each plate is secured a concentric series of bowed springs $C^2$ by means of apertured central lugs, $C^3$, and attaching-screws, the ends of the springs being slotted, as at $C^4$.

D are the concave sections, preferably three in number, bearing at their ends upon the periphery of the end plates, C, and having corrugated inner rubbing-surfaces, preferably formed of zinc plates $d$. The sections D do not entirely inclose the drum A, but an opening is left above the offsets C', to permit of inserting and removing the clothes to be washed, the space between the drum and the upper end of the section D next to the offsets C' forming a throat to allow the clothes to pass readily. The sections D are each connected at their ends to the ends of the bowed springs $C^2$ by means of the bolts $D^2$, the headed ends of which engage the slotted ends of the springs, the threaded ends of the bolts passing through ears on the plate C and having thumb-nuts by adjusting which the sections will be caused to yield more or less to the pressure of the clothes in their passage between the drum and rubbing-sections.

In order that the clothes may not catch on the edge of one section when the preceding section is moved outward, arms $D^3$ are secured to the edges of the second and third sections on their outer faces adjacent to and overlapping the adjacent faces of the first and second sections, so that when the first section is forced outward by the clothes it will bear on the arms $D^3$ and force the second section outward, and then the second section will force the adjacent edge of the third section outward.

To prevent the sections from being rotated or partially rotated on the periphery of the plates C, radial pins D are provided between the adjacent edges of said sections and at the upper edge of the third section.

Having thus described my invention, what I claim as new is—

1. The combination, with the revoluble drum, of the relatively-fixed circular plates at opposite ends thereof and provided with offsets and the yielding rubbing-sections bearing on the peripheries of said end plates, the space between the drum and the rubbing-section at the offsets forming a throat, substantially as set forth.

2. The combination, with the revoluble drum, of the circular end plates having bowed springs secured thereto and conforming to the circle described by the drum and end plates, the concave rubbing-sections connected at their opposite ends with the ends of the bowed springs, substantially as set forth.

3. The combination, with the revoluble drum, of the relatively-fixed circular end plates, the bowed springs having central attaching-ears and slatted ends, the concaved rubbing-sections, and the adjusting-bolts connecting the slatted ends of the springs with the opposite ends of each concave section, substantially as set forth.

4. The combination, with the suds-box and the revoluble drum provided with a shaft having bearings on the box, of the circular plates at opposite ends of the drum, having central apertures through which the drum-shaft freely passes and attaching-brackets on their outer faces, bolts securing the brackets to the suds-box, the bowed springs secured to the said end plates, the concave rubbing-sections, and the bolts connecting said sections and the springs, substantially as set forth.

5. The combination, with the suds-box and the revoluble drum journaled therein, of the circular plates secured to the suds-box at opposite ends of and concentric with the ends of the drum, bowed springs on the outer faces of said plates and radial pins on the peripheries of said plates, concave rubbing-sections, and bolts connected to said sections, the said radial pins extending between the adjacent edges of the sections, substantially as and for the purpose set forth.

6. The combination, with the suds-box and the revoluble drum journaled therein, of the circular plates at opposite ends of the drum concentric therewith and having circularly-arranged bowed springs, the concave rubbing-sections on the peripheries of the circular plates, bolts connecting said sections to the ends of the springs, and the arms on the outer faces of two of the sections overlapping the next sections to cause simultaneous movement of the sections at their meeting edges, substantially as set forth.

JOHN WESLEY NEFF.

Witnesses:
L. W. BARTLETT,
GEO. H. BALSLEY.